United States Patent [19]

Yamanaka et al.

[11] Patent Number: 4,805,053

[45] Date of Patent: Feb. 14, 1989

[54] METHOD AND APPARATUS FOR DETECTING POSITION OF TAPE WHEN RECORDING OR REPRODUCING SIGNALS THEREON

[75] Inventors: Masaaki Yamanaka; Fumiyoshi Abe, both of Kanagawa, Japan

[73] Assignee: Sony Corporation, Tokyo, Japan

[21] Appl. No.: 33,798

[22] Filed: Apr. 3, 1987

[30] Foreign Application Priority Data

Apr. 7, 1986 [JP] Japan .................................. 61-079375

[51] Int. Cl.$^4$ ...................... G11B 27/34; G11B 27/18; G11B 15/18
[52] U.S. Cl. .................................. 360/72.3; 360/74.2; 360/137; 242/191
[58] Field of Search .................. 360/69, 71, 72.3, 72.2, 360/72.1, 74.2, 74.4, 137; 242/191

[56] References Cited

U.S. PATENT DOCUMENTS

| | | | |
|---|---|---|---|
| 4,280,159 | 7/1981 | Nakayama | 360/137 |
| 4,347,538 | 8/1982 | Klank | 360/137 |
| 4,381,089 | 4/1983 | Kondo | 242/191 |
| 4,496,117 | 1/1985 | Kashiwagi et al. | 242/191 |
| 4,644,436 | 2/1987 | Unno | 360/137 |

FOREIGN PATENT DOCUMENTS

| | | | |
|---|---|---|---|
| 52-26211 | 2/1977 | Japan | 360/137 |
| 56-90478 | 7/1981 | Japan | 360/137 |
| 59-58644 | 4/1984 | Japan | 360/137 |

Primary Examiner—John H. Wolff
Attorney, Agent, or Firm—Alvin Sinderbrand

[57] ABSTRACT

In recording and/or reproducing signals on a tape running between supply and take-up reels on which the tape is wound, the tape position is detected by initially determining the radii of the outer turns of the tape on the supply and take-up reels with the tape in a reference position, generating signal pulses in response to rotation of the reels for movement of the tape from the reference position, counting the numbers of such signal pulses generated during movement of the tape from the reference position to an arbitrary tape position, and calculating at least one of the radii of the outer turns of the tape on the supply and take-up reels for the arbitrary tape position on the basis of the corresponding radii for the reference tape position and the numbers of the signal pulses counted during movement of the tape from the reference position to the arbitrary tape position. The length along the tape from the reference tape position to the arbitrary tape position may also be calculated on the basis of the radii on the supply and take-up reels, respectively, for the reference tape position, and the numbers of signal pulses counted in correspondence to the revolutions of the supply and take-up reels, respectively, during movement of the tape from the reference position to the arbitrary tape position.

18 Claims, 2 Drawing Sheets

FIG. I

METHOD AND APPARATUS FOR DETECTING POSITION OF TAPE WHEN RECORDING OR REPRODUCING SIGNALS THEREON

BACKGROUND OF THE INVENTION

1. Field of the Invention

This invention relates generally to a method and apparatus for detecting the position of a tape when recording or reproducing signals thereon.

2. Description of the Prior Art

In a conventional tape recorder, a timer roller is in rolling engagement with the tape so as to be rotated in response to movement of the tape between the supply and take-up reels on which the tape is wound. The length of the tape that is transported is directly measured on the basis of the number of revolutions of the timer roller, and the tape position can be determined from the transported tape length, while the amount of recording time that remains can be determined from such transported tape length and the speed at which the tape is being transported or advanced. It is also known to frequency divide the signal pulses provided as the output of the timer roller, whereupon the frequency divided output can be supplied to a counter which acts as a time indicator. In the foregoing case, the precision with which the tape position can be measured is determined by the accuracy with which the diameter of the timer roller is maintained during manufacture and also upon the slippage between the timer roller and the driven tape. Thus, it is necessary to pay strict attention to the precision with which the timer roller is machined, and to the uniformity of its material and bearing structure, and the like, whereby the cost of production of the timer roller is increased. Further, the tape is prone to be damaged due to its frictional contact with the timer roller for rotating the latter.

It is also known to provide a control signal, such as, a CTL signal, which is pre-recorded on the tape and thereafter reproduced as the tape is transported during a recording or reproducing operation for use as a clock pulse signal by a timer counter which indicates the tape position on the basis of the counted control signals that have been reproduced. However, this known method cannot be applied when recording on a blank tape.

It is also known to detect the tape position by initially squaring the numbers of pulses generated in response to rotations of the reels so as to determine the total amount of the tape on the reels, and then to calculate the absolute time of the tape position by employing the determined amount of the tape and the length of the tape that has been transported for ascertaining the amount of the tape that remains to be recorded or reproduced.

In accordance with still another known method for determining a tape position, the numbers of revolutions of the supply and take-up reels, respectively, are detected during the transportation of the tape through a relatively short distance, and a voltage is obtained proportional to the ratio of such numbers of revolutions, whereupon such voltage is convereted into a tape position indication. However, since the ratio of the numbers of revolutions of the supply and take-up reels is determined only during the transport of the tape through a relatively short distance, a monotonically increasing function is not obtained by reason of the quantization error in the rotation or non-circularity of a reel or reels. Therefore, it is difficult to ensure proper recognition of slight angular displacement of the reels during transport of the tape. Moreover, it is not possible with the existing system to achieve high precision in determining the tape position, for example, as when it is necessary to reproduce a given tape position for cueing or the like.

OBJECTS AND SUMMARY OF THE INVENTION

Accordingly, it is an object of this invention, to provide an improved method and apparatus for detecting tape position when recording and/or reproducing signals on a tape extending between supply and take-up reels, and which avoids the above mentioned disadvantages of the prior art.

In accordance with an aspect of this invention, in an apparatus for recording and/or reproducing signals on a tape in a run extending between supply and take-up reels on which the tape is wound; a tape position is detected by initially determining radii of the outer turns of the tape on the supply and take-up reels with the tape in a reference position thereof, generating signal pulses in correspondence to the revolutions of the supply and take-up reels for movement of the tape from the reference position, counting the numbers of signal pulses generated in correspondence to the revolutions of the supply and take-up reels in response to movement of the tape from the reference position to an arbitrary tape position, and calculating at least one of the radii of the outer turns of the tape on the supply and take-up reels for the arbitrary tape position from the following:

$$r_S = \frac{2N_T \cdot N_S \cdot r_{TP} + (N_T^2 - N_S^2) r_{SP}}{N_S^2 + N_T^2}$$

$$r_T = \frac{2N_T \cdot N_S \cdot r_{SP} + (N_S^2 - N_T^2) r_{TP}}{N_T^2 + N_S^2}$$

in which $r_S$ and $r_T$ are the radii on the supply and take-up reels, respectively, for the arbitrary tape position, $r_{SP}$ and $r_{TP}$ are the radii on the supply and take-up reels, respectively, for said reference tape position, and $N_S$ and $N_T$ are the numbers of the signal pulses counted in correspondence to the revolutions of said supply and take-up reels, respectively, for said movement of the tape from said reference position to said arbitrary tape position.

In the case where the tape has control signals recorded thereon at regular intervals, it is another aspect of the invention to detect the control signals recorded on the tape, to frequency divide said signal pulses generated in correspondence to the revolutions of one of the supply and take-up reels in phase synchronization with the detected control signals from the tape, to calculate a dividing ratio for the frequency division on the basis of said one of the radii on said supply and take-up reels, respectively, and to operate a tape timer by means of the frequency divided pulses.

In accordance with a desirable feature of this invention, the dividing ratio is calculated as follows:

$$N = \frac{V \cdot N_R}{F \cdot 2\pi r_T}$$

in which N is said dividing ratio, V is the speed of tape movement, F is the frame frequency, $r_T$ is the radius of the outer turn of the tape on one of the reels, and $N_R$ is the number of said signal pulses generated in correspondence to each of the revolutions of that one reel.

The above, and other objects, features and advantages of the invention, will be apparent in the following detailed description of a preferred embodiment of the invention which is to be read in connection with the accompanying drawings wherein like parts are identified by the same reference numerals in the several views.

BRIEF DESCRIPTION OF THE INVENTION

FIG. 1 is a schematic view showing an apparatus according to an embodiment of this invention in an initial state; and FIG. 2 is a schematic view similar to that of FIG. 1, but showing the apparatus at a later stage in its operation.

DESCRIPTION OF A PREFERRED EMBODIMENT

Figure 1:
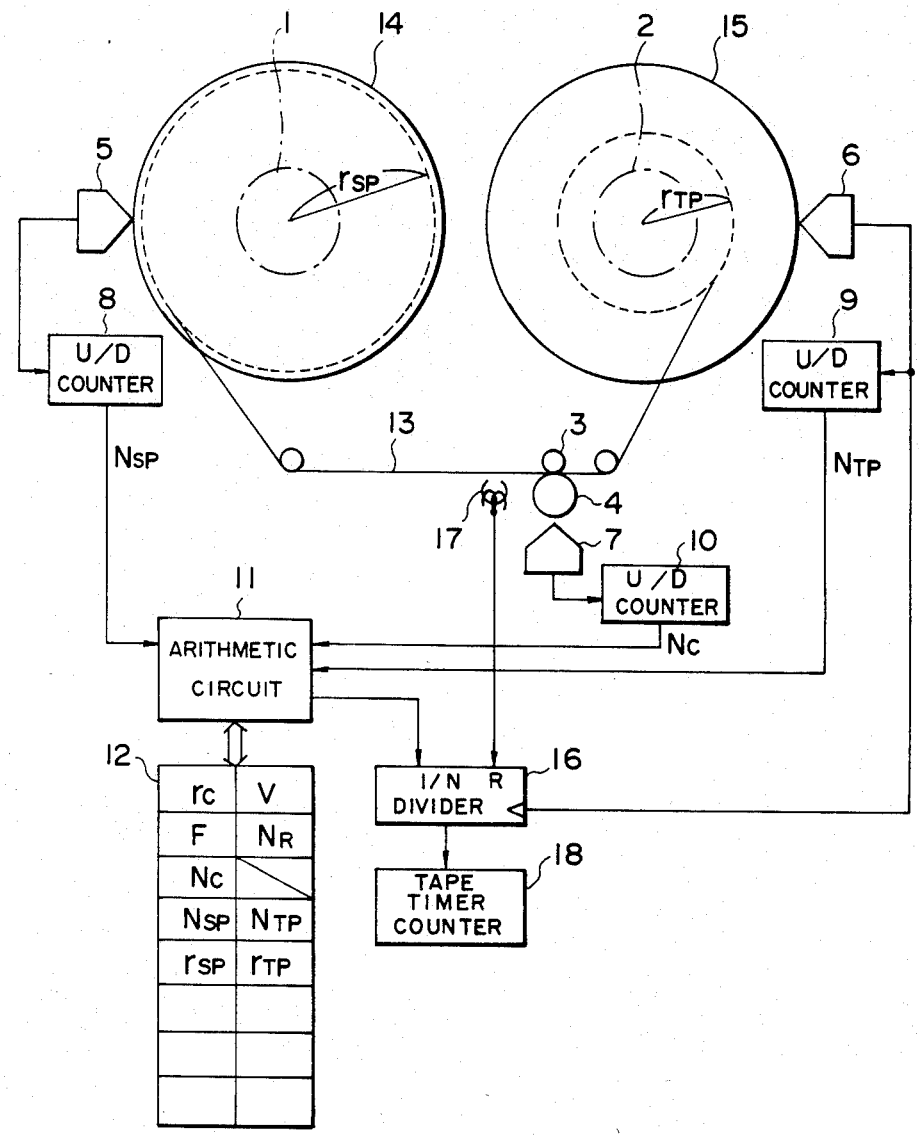

Referring to the drawings in detail and initially to FIG. 1 thereof, a conventional video tape recorder (VTR) is there shown to have a supply reel table 1, a take-up reel table 2, a pinch roller 3 and a capstan 4. In accordance with this invention, such VTR further includes rotation detectors 5,6 and 7, which are desirably in the form of frequency generators (FG), for supply reel table 1, take-up reel table 2 and capstan 4, respectively. Up/down counters 8,9 and 10 are connected to rotation detectors 5,6 and 7, and to an arithmetic circuit 11 which is, in turn, connected to a memory 12.

A tape 13, which may be contained in a cassette case, is wound on a supply reel 14 and a take-up reel 15 which are placed on supply reel table 1 and take-up reel 2, respectively, when the cassette case is loaded in the VTR.

The tape position, that is, the location along the tape between the supply and take-up reels 14 and 15 at which recording or reproducing can be effected when the tape is initially loaded into the VTR, is hereinafter referred to as a "reference tape position".

When the tape 13 is initially driven a short length or distance from the reference tape position, a web radius $r_{SP}$ of the supply reel 14, that is, the radius of the outer turn of the tape on reel 14, and a web radius $r_{TP}$ of the take-up reel 15, that is, the radius of the outer turn of the tape on reel 15, in the reference tape position can be calculated from the following equations:

$$r_{SP} = \frac{\Delta n_C \cdot r_C}{\Delta n_S} \text{ and } r_{TP} = \frac{\Delta n_C \cdot r_C}{\Delta n_T} \quad (1)$$

where, $\Delta n_S$, $\Delta n_T$ and $\Delta n_C$ represent the numbers of revolutions of the reels 14 and 15 and the capstan 4, respectively, when the tape 13 is initially driven the short length or distance from the reference position, and $r_C$ represents the radius of the capstan 4.

Figure 2:
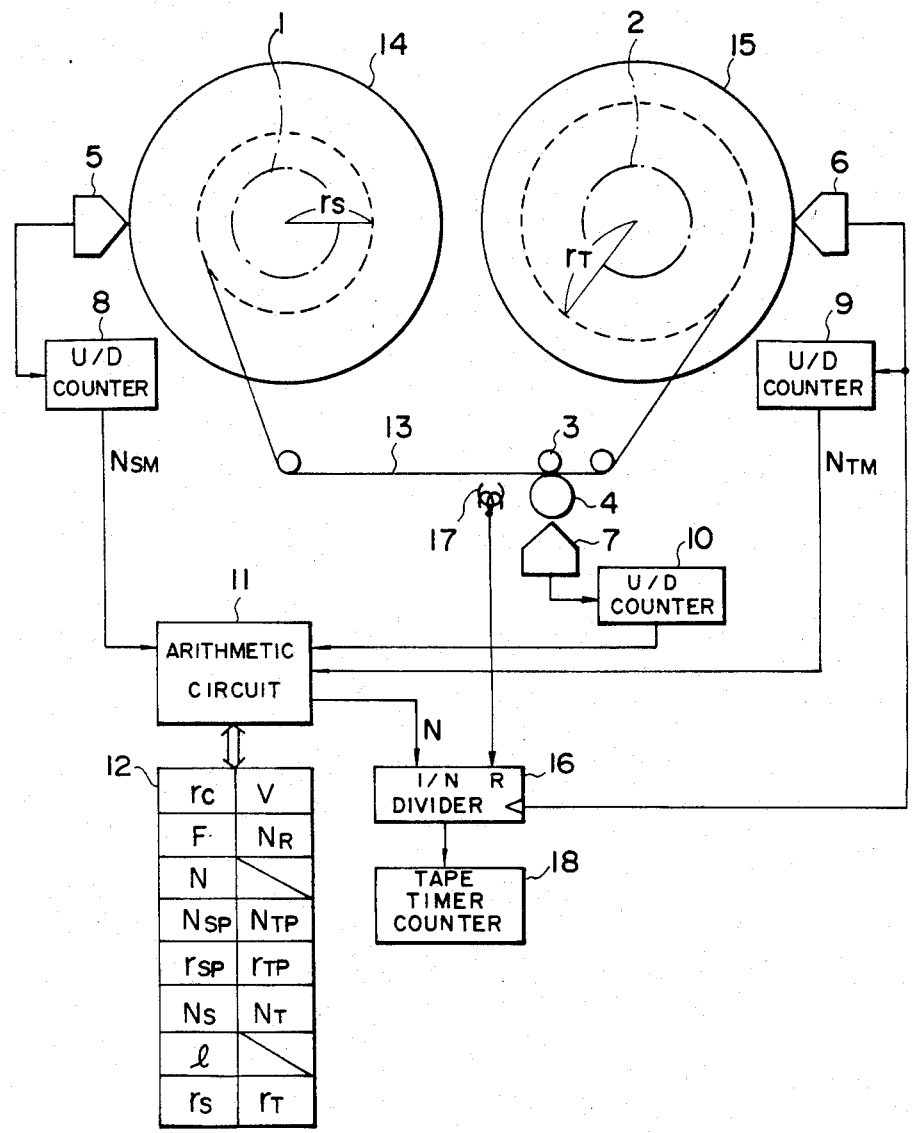

Assuming that $n_S$ and $n_T$ represent the numbers of revolutions of the supply reel 14 and the take-up reel 15 occurring during the tape movement from the reference tape position to an arbitrary tape position as shown in FIG. 2, a web radius $r_S$ of the supply reel 14 and a web radius $r_T$ of the take-up reel 15 in the arbitrary tape position are calculated from the following equations:

$$r_S = r_{SP} - n_S \cdot t$$

and $$r_T = r_{TP} + n_T \cdot t \quad (2)$$

where, t designates the thickness of the tape 13.

From equations (2), the following equation is derived:

$$n_S(r_{TP} - r_{TP}) = n_t(r_{SP} - r_S) \quad (3)$$

The length l of the transported tape is obtained from the following equation:

$$l = \frac{(r_{SP}^2 - r_S^2)}{t} = \frac{(r_T^2 - r_{TP}^2)}{t} \quad (4)$$

$$= \frac{(r_{SP}^2 - r_S^2)}{\frac{r_{SP} - r_S}{n_S}} = \frac{(r_T^2 - r_{TP}^2)}{\frac{r_T - r_{TP}}{n_T}}$$

$$l = n_S(r_{SP} + r_S) = n_T(r_T + r_{TP})$$

From equations (3) and (4), the web radii $r_S$ and $r_T$ are calculated as follows:

$$r_S = \frac{2 n_T \cdot n_S \cdot r_{TP} + (n_T^2 - n_S^2)r_{SP}}{n_S^2 + n_T^2} \quad (5)$$

$$r_T = \frac{2 n_T \cdot n_S \cdot r_{SP} + (n_S^2 - n_T^2)r_{TP}}{n_T^2 + n_S^2} \quad (6)$$

The length l of the transported tape can be expressed by substituting equations (5) and (6) in equation (4) so as to obtain the following:

$$l = \frac{2 n_T \cdot n_S(n_T r_{SP} + n_S r_{TP})}{n_T^2 + n_S^2} \quad (7)$$

Thus, the length l of the transported tape can be calculated from the web radius on each reel at the reference tape position and the numbers of revolutions of reels 14 and 15 occurring during movement of the tape from the reference tape position to the arbitrary tape position.

As shown in FIG. 1, when the pinch roller 3 is pressed against the capstan 4 in the reference tape position and the tape 13 is driven a short distance by the capstan 4 which is connected with a capstan motor (not shown), rotation detectors 5,6 and 7 generate pulse signals containing numbers $N_{SP}$, $N_{TP}$ and $N_C$, respectively, of pulses corresponding to the revolutions of supply reel table 1, take-up reel table 2 and capstan 4, respectively.

The pulse signals from the rotation detectors 5,6 and 7 are supplied to up/down counters 8,9 and 10, respectively, and the counts $N_{SP}$, $N_{TP}$ and $N_C$ thereof are provided to memory 12.

Since the radius $r_C$ of the capstan 4 is a constant, it can be stored previously in memory 12. The web radius $r_{SP}$ of supply reel 14 and the web radius $r_{TP}$ of take-up reel 15 in the reference tape position are obtained by substituting, in equations (1) in arithmetic circuit 11, the numbers of revolutions $\Delta n_S$ and $\Delta n_T$ of supply and take-up reels 14 and 15 and the number $\Delta n_C$ of revolutions of capstan 4 derived from the counts $N_{SP}$, $N_{TP}$ and $N_C$ when the tape is initially driven a short distance. If the number $\Delta n_C$ of revolutions of capstan 4 is a constant predetermined number, that is, the short distance through which the tape is initially driven is a predetermined constant short distance, such constant value for $\Delta n_C$ is also stored in memory 12, and it is only necessary to limit the initial movement of the tape to the predetermined short distance and to supply to arithmetic circuit 11 the value of $\Delta n_C$ stored in memory 12 and the values of $\Delta n_S$ and $\Delta n_T$ derived from the counts $N_{SP}$ and $N_{TP}$, respectively, for substitution in equations (1). The resulting web radii $r_{SP}$ and $r_{TP}$ for the reference tape position are then also stored in memory 12.

During the rotation of reels 14 and 15 accompanying the movement of tape 13 to the arbitrary tape position, rotation detectors 5 and 6 continuously generate the pulse signals which are supplied to up/down counters 8 and 9 as the clock signals therefor so as to produce counts $N_{SM}$ and $N_{TM}$, respectively.

As shown in FIG. 2, the counts $N_{SM}$ and $N_{TM}$ of up/down counters 8 and 9 are fed to arithmetic circuit 11 which subtracts therefrom the counts $N_{SP}$ and $N_{TP}$, respectively, stored in memory 12 so as to produce subtracted values $N_S$ and $N_T$ corresponding to the numbers of revolutions of supply reel 14 and take-up reel 15 occurring during tape movement from the tape reference position to the arbitrary tape position, whereupon, such subtracted values $N_S$ and $N_T$ are stored in memory 12.

The arithmetic circuit 11 is provided with the values $N_S$ and $N_T$ and the web radii $r_{Sp}$ and $r_{TP}$ from memory 12 and derives the length or distance l through which the tape 13 has been transported, and the web radii $r_S$ and $r_T$ at the arbitrary tape position by calculating equations (5), (6) and (7) at successive predetermined periods.

The tape play time corresponding to the arbitrary tape position can be obtained from l/V, where V represents the tape speed in a normal reproduction mode, and such tape play time can also be stored in memory 12.

It has been customary to measure the web radius at each movement of the tape through a short distance. In the present embodiment, however, measurement of the web radius is required merely once at the reference tape position, so that it is possible to eliminate the quantization error or circularity error and thereby ensure a monotonically increasing function. Furthermore, since no timer roller is employed, the structure can be simplified and the cost of production is reduced.

In the embodiment of the present invention shown on FIG. 1, the VTR further has a frequency dividing counter 16 connected to one of the rotation detectors 5 and 6, for example, to the detector 6 as shown, and such counter 16 is supplied with the signal pulses from detector 6 at a clock terminal CK thereof. A control signal detection head 17 is also provided for detecting control signals pre-recorded on a predetermined portion of the tape and supplied to counter 16 at a reset terminal R as a reset signal therefor so as to effect phase synchronism of the divided output of counter 16 with the detected control signals. The arithmetic circuit 11 calculates a frequency dividing ratio N of counter 16 on the basis of the web radius $r_T$ at the arbitrary tape position and a tape timer counter 18 is connected to the counter 16 and driven by the output of the latter so as to serve as a visual tape position display.

The rotation $dn_T$ of the take-up reel 15 corresponding to tape motion through a small distance dl from an arbitrary tape position is expressed as:

$$dn_T = \frac{dl}{2\pi r_T} \quad (8)$$

where $r_T$ represents the web radius of the take-up reel 15 with the tape at the arbitrary position thereof.

If it is assumed that dl represents a tape length per frame of the video signal, that can be expressed as:

$$dl = \frac{V}{F} \quad (9)$$

where F designates the frame frequency of the video signal.

The output pulses of the rotation detector 6 are frequency divided by counter 16 to become frame period pulses suitable for actuating tape timer 18. The frequency dividing ratio N of counter 16 is calculated by arithmetic circuit 11 from the following equation:

$$N = N_R \cdot dn_T = \frac{V \cdot N_R}{F \cdot 2\pi r_T} \quad (10)$$

where $N_R$ designates the number of pulses from detector 6 for each revolution of a frequency generator FG associated with take-up reel 15.

The arithmetic circuit 11 calculates the frequency dividing ratio N according to equation (10) by using, in such equation, the tape speed V, the pulse number $N_R$ and the frame frequency F which are stored in memory 12, and the web radius $r_T$ which is obtained from equation (6) for every calculating cycle. The resulting value of N is supplied to counter 16, where the clock signal from rotation detector 6 is frequency divided by N. The counter 16 is reset each time the control signal reproduced from tape 13 by head 17 is fed thereto. Consequently, the tape timer operating pulses provided by counter 16 are produced in phase synchronism with the control signal on the tape and are fed to the tape timer counter 18 where the number of the timer pulses is counted for correspondingly displaying the play time which corresponds to the arbitrary tape position.

Thus, the described embodiment of the invention is advantageous in that enhanced precision of tape position indication is ensured when a frame address is recorded on the tape.

As distinguished from the above described embodiment in which the frequency dividing ration N is repeatedly calculated from the changing web tape radius $r_T$, it is also possible to preset the ratio N at a suitable value in case the tape is transported over a short distance to cause a small change in the web tape radius, in case any dropout of the control signal needs to be corrected with regard to the tape recorded almost continuously, or in case a tape recorded only with the information signal is to be positioned exactly.

Although frequency dividing counter 16 receives, as a clock, the signal pulses from rotation detector 6 associated with take-up reel 15 in the above-described embodiment, the same operation can be performed when the output pulses of rotation detector 5 associated with supply reel 14 are fed as a clock signal to counter 16.

By way of summary, it will be appreciated that, in accordance with the present invention as described hereinabove, the web radius $r_T$ or $r_S$ on at least one of the supply and take-up reels is measured, and pulses generated in accordance with the rotation of at least that one of the reels are frequency-divided by the counter 16 in phasesynchronism with the control signal pre-recorded on the tape. The frequency dividing ratio of the counter is set in conformity with the measured web radius, and the tape position display is driven by the output of the frequency-dividing counter, so that a timer roller, as customarily used in the prior art, is no longer necessary, thereby to simplify the structure and curtail the production cost while keeping the tape free from possible damage by the timer roller.

Furthermore, since measurement of the web radius is required merely once, any error derived from quantization or non-circularity can be eliminated, and the result of such measurement becomes a monotonically increasing function to consequently attain high precision in the detection of tape position.

Having described a preferred embodiment of the invention with reference to the accompanying drawings, it is to be understood that the invention is not limited to that precise embodiment and that various changes and modifications can be effected therein by one skilled in the art without departing from the scope or spirit of the invention as defined in the appended claims.

What is claimed is:

1. In an apparatus for recording and/or reproducing signals on a tape in a run extending between supply and take-up reels on which the tape is wound; a tape position detecting device comprising:

means for determining radii of the outer turns of said tape on said supply and take-up reels with the tape in a reference position;

means for generating signal pulses in correspondence to the revolutions of said supply and take-up reels for movement of said tape from said reference position;

means for counting the numbers of said signal pulses generated in correspondence to the revolutions of said supply and take-up reels in response to said movement of the tape from said reference position to an aribitrary tape position; and means for calculating at least one of said radii of the outer turns of the tape on said supply and take-up reels for said arbitrary tape position from the following:

$$r_S = \frac{2N_T \cdot N_S \cdot r_{TP} + (N_T^2 - N_S^2) r_{SP}}{N_S^2 + N_T^2}$$

$$r_T = \frac{2N_T \cdot N_S \cdot r_{SP} + (N_S^2 - N_T^2) r_{TP}}{N_T^2 + N_S^2}$$

in which $r_S$ and $r_T$ are said radii on said supply and take-up reels, respectively, for said arbitrary tape position, $r_{SP}$ and $r_{TP}$ are said radii on said supply and take-up reels, respectively, for said reference tape position, and $N_S$ and $N_T$ are said numbers of the signal pulses counted in correspondence to the revolutions of said supply and take-up reels, respectively, for said movement of the tape from said reference position to said arbitrary tape position.

2. Apparatus according to claim 1; in which the tape has control signals recorded thereon at regular intervals; and in which said tape position detecting device further comprises means for detecting said control signals recorded on the tape, means for repeatedly counting a predetermined number of said signal pulses generated in correspondence to the revolutions of one of said supply and take-up reels and providing an output signal upon each said counting of said predetermined number, said means for repeatedly counting being phase synchronized with the detected control signals from the tape, and means for varying said predetermined number of said signal pulses in accordance with said one of said radii on said supply and take-up reels, respectively.

3. Apparatus according to claim 2; in which said signals recorded and/or reproduced on the tape are video signals comprised of successive frames, means are provided for measuring the speed of tape movement, means are provided for measuring the frequency of said frames, and said varying predetermined number of signal pulses is calculated in accordance with the following equation:

$$N = \frac{V \cdot N_R}{F \cdot 2\pi r_T}$$

in which N is said predetermined number, V is the speed of tape movement, F is the frame frequency, $r_T$ is said one of the radii of the outer turns of the tape on said reels, and $N_R$ is the number of said signal pulses generated in correspondence to each of the revolutions of said reel on which said outer turn of the tape has said radius $r_T$.

4. Apparatus according to claim 3; further comprising means operable by said output signal of said means for repeatedly counting for providing a visual indication of the tape position.

5. In an apparatus for recording and/or reproducing signals on a tape in a run extending between supply and take-up reels on which the tape is wound; a tape position detecting device comprising:

means for determining radii of the outer turns of said tape on said supply and take-up reels with the tape in a reference position;

means for generating signal pulses in correspondence to the revolutions of said supply and take-up reels for movement of said tape from said reference position;

means for counting the numbers of said signal pulses generated in correspondence to the revolutions of said supply and take-up reels in response to said movement of the tape from said reference position to an arbitrary tape position; and means for calculating the length l along the tape from said reference tape position to said arbitrary tape position from the following:

$$l = \frac{2 N_T \cdot N_S (N_T \cdot r_{SP} + N_S \cdot r_{TP})}{N_T^2 + N_S^2}$$

in which $r_{SP}$ and $r_{TP}$ are said radii on said supply and take-up reels, respectively, for said reference tape position, and $N_S$ and $N_T$ are said numbers of the signal pulses counted in correspondence to the revolutions of said supply and take-up reels, respectively, for said movement of the tape from said reference position to said arbitrary tape position.

6. In an apparatus for recording and/or reproducing video signals on a tape in a run extending between supply and take-up reels on which the tape is wound, said tape having control signals recorded thereon at regular intervals;

a tape position detection device comprising:

means for determining the radius of the outer turn of said tape on at least one of said reels;

means for generating signal pulses in correspondence to rotation of said one reel in response to movement of the tape between said reels;

means for detecting said control signals recorded on the tape;

means for repeatedly counting a predetermined number of said signal pulses in phase synchronism with the detected control signals from the tape and providing an output signal upon each said counting of said predetermined number;

means for varying said predetermined number of said signal pulses to be repeatedly counted in accordance with said radius; and means operable by said output signal from said means for repeatedly counting for indicating the tape position.

7. An apparatus according to claim 6; in which said means operable by said output signal of said means for repeatedly counting provides a visual indication of the tape position.

8. An apparatus according to claim 7; in which the video signals recorded and/or reproduced on the tape are comprised of successive frames, means are provided for measuring the speed of tape movement, means are provided for measuring the frequency of said frames, and said varying predetermined number of signal pulses is calculated in accordance with the following equation:

$$N = \frac{V \cdot N_R}{F \cdot 2\pi r_T}$$

in which N is said predetermined number, V is the speed of tape movement, F is the frame frequency, $r_T$ is said radius of the outer turn of the tape on said one reel, and $N_R$ is the number of said signal pulses generated in correspondence to each of the revolutions of said one reel.

9. In recording and/or reproducing signals on a tape in a run extending between supply and take-up reels on which the tape is wound, a method of detecting tape position comprising:

determining radii of the outer turns of said tape on said supply and take-up reels with the tape in a reference position;

generating signal pulses in correspondence to the revolutions of said supply and take-up reels for movement of said tape from said reference position;

counting the numbers of said signal pulses generated in correspondence to the revolutions of said supply and take-up reels in response to said movement of the tape from said reference positoin to an arbitrary tape position; and calculating at least one of said radii of the outer turns of the tape on said supply and take-up reels for said arbitrary tape position from the following:

$$r_S = \frac{2N_T \cdot N_S \cdot r_{TP} + (N_T^2 - N_S^2) r_{SP}}{N_S^2 + N_T^2}$$

$$r_T = \frac{2N_T \cdot N_S \cdot r_{SP} + (N_S^2 - N_T^2) r_{TP}}{N_T^2 + N_S^2}$$

in which $r_S$ and $r_T$ are said radii on said supply and take-up reels, respectively, for said arbitrary tape position, $r_{SP}$ and $r_{TP}$ are said radii on said supply and take-up reels, respectively, for said reference tape position, and $N_S$ and $N_T$ are said numbers of the signal pulses counted in correspondence to the revolutions of said supply and take-up reels, respectively, for said movement of the tape from said reference position to said arbitrary tape position.

10. The method according to claim 9, in which the tape has control signals recorded thereon at regular intervals; and further comprising detecting said control signals recorded on the tape, repeatedly counting a predetermined number of said signal pulses generated in correspondence to the revolutions of one of said supply and take-up reels in phase synchronization with the detected control signals from the tape and providing an output signal upon each said counting of said predetermined number, and varying said predetermined number of said signal pulses in accordance with said one of said radii on said supply and take-up reels, respectively.

11. The method according to claim 10; in which the signals recorded and/or reproduced on the tape are video signals comprises of successive frames; and further comprising measuring the speed of tape movement, measuring the frequency of said frames, and calculating said varying predetermined number of signal pulses in accordance with the following equation:

$$N = \frac{V \cdot N_R}{F \cdot 2\pi r_T}$$

in which N is said predetermined number, V is the speed of tape movement, F is the frame frequency, $r_T$ is said one of the radii of the outer turns of the tape on said reels, and $N_R$ is the number of said signal pulses generated in correspondence to each of the revolutions of said reel on which said outer turn of the tape has said radius $r_T$.

12. The method according to claim 11; further comprising providing a visual indication of the tape position in response to the output signals upon said repeated countings of said predetermined number of signal pulses.

13. In recording and/or reproducing signals on a tape in a run extending between supply and take-up reels on which the tape is wound, a method of detecting tape position comprising:

determining radii of the outer turns of said tape on said supply and take-up reels with the tape in a reference position;

generating signal pulses in correspondence to the revolutions of said supply and take-up reels for movement of said tape from said reference position;

counting the numbers of said signal pulses generated in correspondence to the revolutions of said supply and take-up reels in response to said movement of the tape from said reference position to an arbitrary tape position; and calculating the length l along the tape from said reference tape position to said arbitrary tape position from the following:

$$l = \frac{2 N_T \cdot N_S(N_T \cdot r_{SP} + N_S \cdot r_{TP})}{N_T^2 + N_S^2}$$

in which $r_{SP}$ and $r_{TP}$ are said radii on said supply and take-up reels, respectively, for said reference tape position, and $N_S$ and $N_T$ are said numbers of the signal pulses counted in correspondence to the revolutions of said supply and take-up reels, respectively, for said movement of the tape from said reference position to said arbitrary tape position.

14. In recording and/or reproducing video signals on a tape in a run extending between supply and take-up reels on which the tape is would, said tape having control signals recorded thereon at regular intervals, a method of detecting tape position comprising:
   determining the radius of the outer turn of said tape on at least one of said reels;
   generating signal pulses in correspondence to rotation of said one reel in response to movement of the tape between said reels;
   detecting said control signals recorded on the tape;
   repeatedly counting a predetermined number of said signal pulses in phase synchronism with the detected control signals from the tape and providing an output signal upon each said counting of said predetermined number; varying said predetermined number of said signal pulses in accordance with said radius; and
   providing an indication of the tape position in response to output signals upon said countings of the predetermined number.

15. The method according to claim 14; in which a visual indication of the tape position is provided in response to said output signals upon said repeated countings of said predetermined number of signal pulses.

16. The method according to claim 15; in which the video signals are comprised of successive frames; and further comprising measuring the speed of tape movement, measuring the frequency of said frames, and calculating said varying predetermined number of signal pulses in accordance with the following equation:

$$N = \frac{V \cdot N_R}{F \cdot 2\pi r_T}$$

in which N is said predetermined number, V is the speed of tape movement, F is the frame frequency, $r_T$ is said radius of the outer turn of the tape on said one reel, and $N_R$ is the number of said signal pulses generated in correspondence to each of the revolutions of said one reel.

17. The method according to claim 16; in which said radius $r_T$ is calculated as follows:

$$r_T = \frac{2 N_T N_S r_{SP} + (N_S^2 - N_T^2) r_{TP}}{N_T^2 + N_S^2}$$

in which $r_{SP}$ and $r_{TP}$ are radii of the outer turns of the tape on said supply and take-up reels, respectively, in a reference tape position, and $N_S$ and $N_T$ are numbers of signal pulses generated in correspondence to the revolutions of said supply and take-up reels, respectively, for movement of the tape from said reference position to an arbitrary tape position at which said radius $r_T$ is calculated.

18. The method according to claim 17; in which the tape is driven by a rotated capstan through an initial distance from said reference position, and said radii $r_{SP}$ and $r_{TP}$ are calculated as follows:

$$r_{SP} = \frac{\Delta n_C \cdot r_C}{\Delta n_S} \text{ and } r_{TP} = \frac{\Delta n_C \cdot r_C}{\Delta n_T}$$

in which $\Delta n_S, \Delta n_T$ and $\Delta n_C$ are the numbers of revolutions of the supply and take-up reels and of the capstan, respectively, when the tape is driven through said initial distance, and $r_C$ is the radius of the capstan.

* * * * *